United States Patent [19]
Greanias et al.

[11] Patent Number: 5,149,919
[45] Date of Patent: * Sep. 22, 1992

[54] STYLUS SENSING SYSTEM

[75] Inventors: Evon C. Greanias, Chevy Chase, Md.; Frank L. Stein, Vienna, Va.; Robert Donaldson; Michael Gray, both of Annapolis, Md.

[73] Assignee: International Business Machines Corporation, Armonk, N.Y.

[*] Notice: The portion of the term of this patent subsequent to May 26, 2009 has been disclaimed.

[21] Appl. No.: 798,471

[22] Filed: Nov. 26, 1991

Related U.S. Application Data

[62] Division of Ser. No. 608,062, Oct. 31, 1990, Pat. No. 5,117,071.

[51] Int. Cl.⁵ .............................................. G08C 21/00
[52] U.S. Cl. ........................................ 178/19; 340/706
[58] Field of Search .................... 178/18, 19; 340/706, 340/709

[56] References Cited

U.S. PATENT DOCUMENTS

| | | | |
|---|---|---|---|
| 3,818,133 | 6/1974 | Cotter | 178/18 |
| 3,886,311 | 5/1975 | Rodgers et al. | 178/18 |
| 3,999,012 | 12/1976 | Dym et al. | 178/18 |
| 4,009,338 | 2/1977 | Dym et al. | 178/18 |
| 4,423,229 | 12/1983 | Gurol et al. | 210/159 B |
| 4,571,454 | 2/1986 | Tamaru et al. | 178/18 |
| 4,650,926 | 3/1987 | Nakamura et al. | 178/18 |
| 4,678,869 | 7/1987 | Kable | 178/19 |
| 4,686,332 | 8/1987 | Greanias et al. | 178/19 |
| 4,695,680 | 9/1987 | Kable | 178/19 |
| 4,740,660 | 4/1988 | Kimura | 178/19 |
| 4,931,782 | 6/1990 | Jackson | 340/706 |

OTHER PUBLICATIONS

*IBM TDB* Article, entitled "Dual-Level Pen for Capacitive Sensing of Tablet Signals" vol. 17, No. 2, Jul. 1974, pp. 572-574.

Primary Examiner—Stafford D. Schreyer
Attorney, Agent, or Firm—Jeffrey S. LaBaw

[57] ABSTRACT

An improved stylus detection system for use on the surface of a display device. An overlay having horizontal and vertical transparent conductors is coupled to other elements of the systems through a bus having a minimal number of bus wires. A control processor issues command signal which selectively couple transparent conductors to a radiative measuring device to determine stylus position accurately. The system includes a radiative pickup stylus having a spherical antenna which receive the overlay signal independent of the angle at which it is held. Further, a contact detecting mode has been added to eliminate spurious contact position measured between strokes, when the stylus is proximate to but not in contact with the overlay.

16 Claims, 13 Drawing Sheets

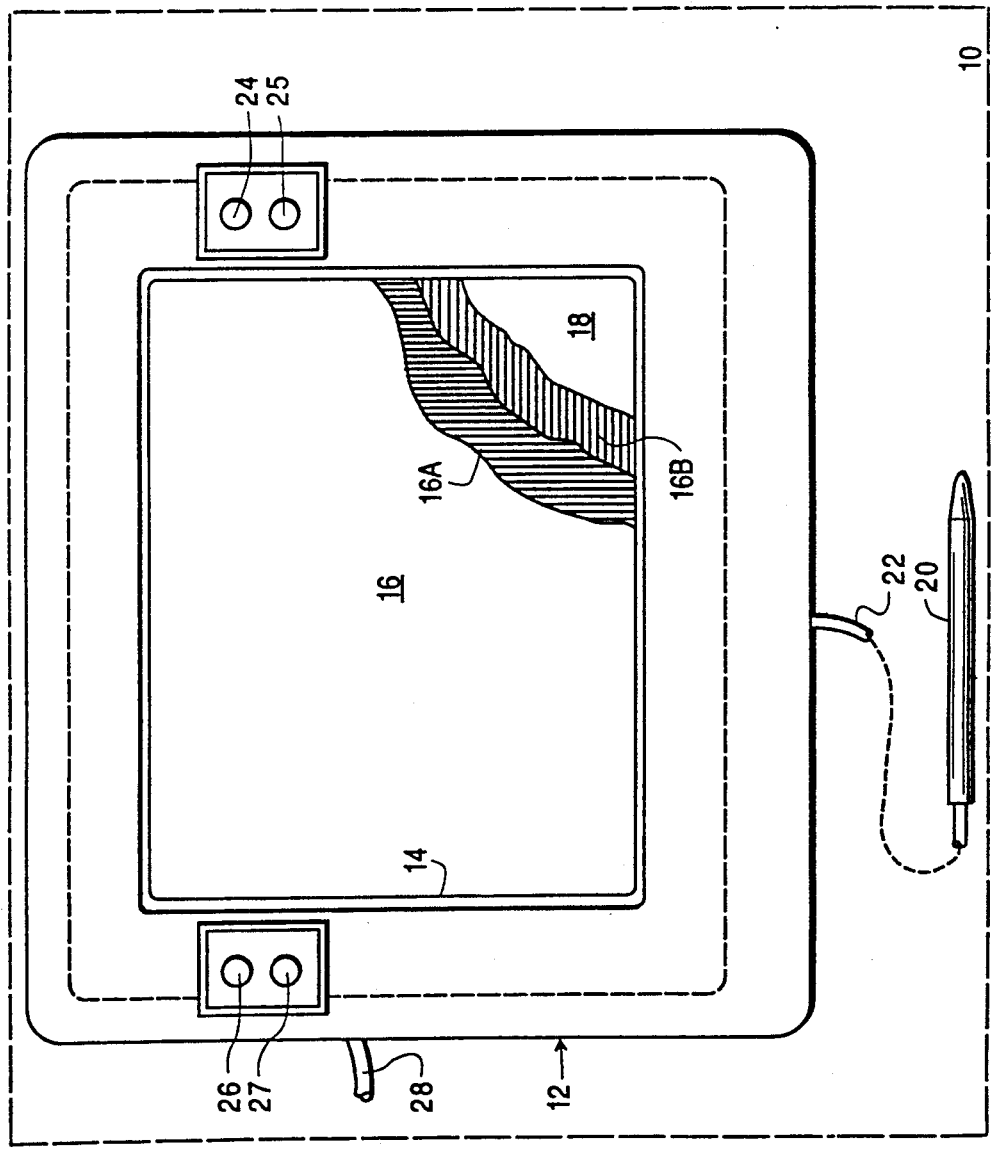

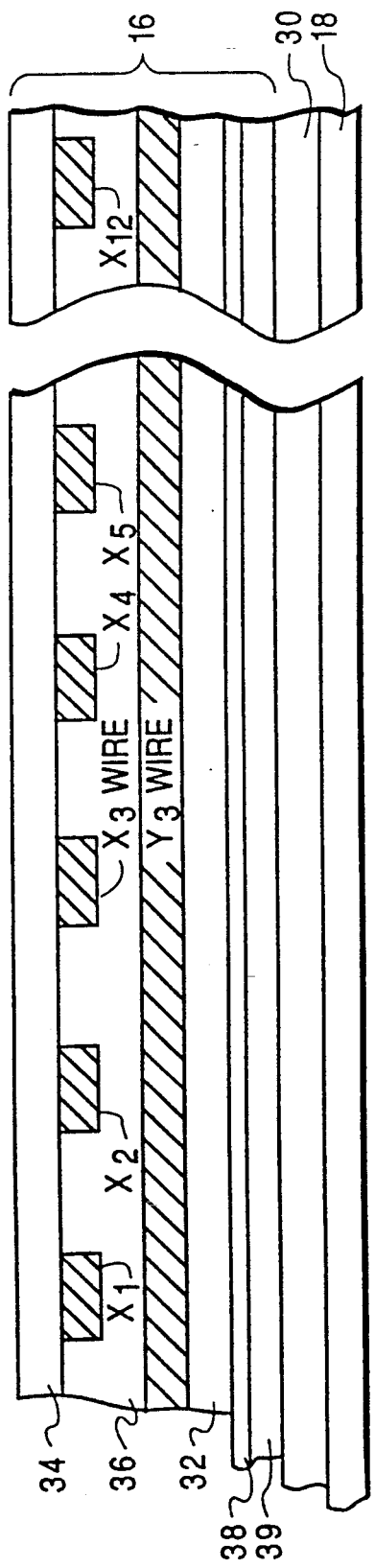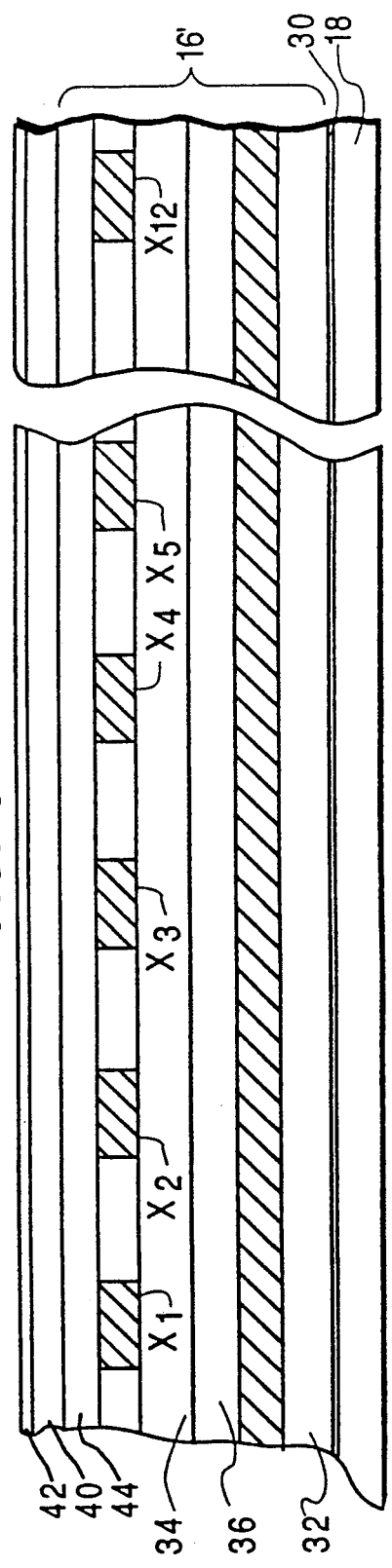

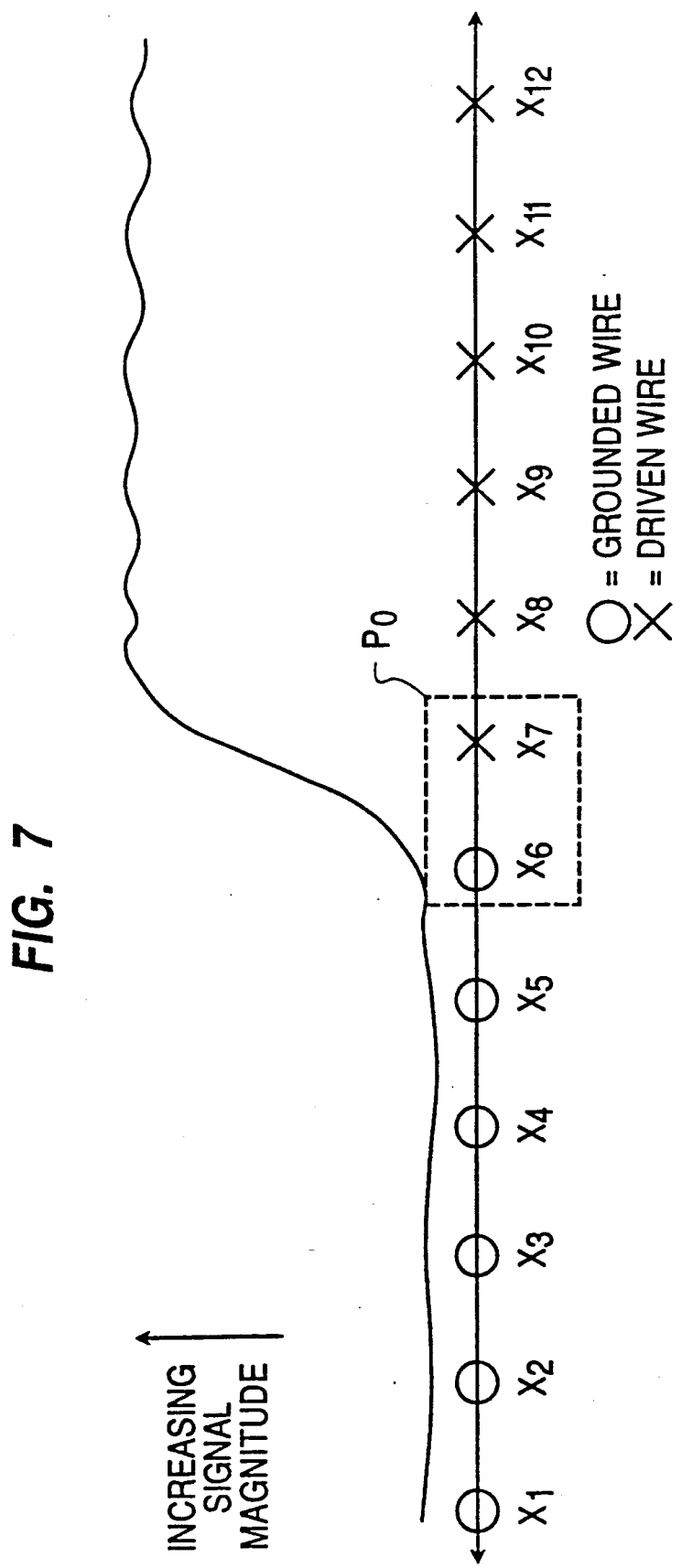

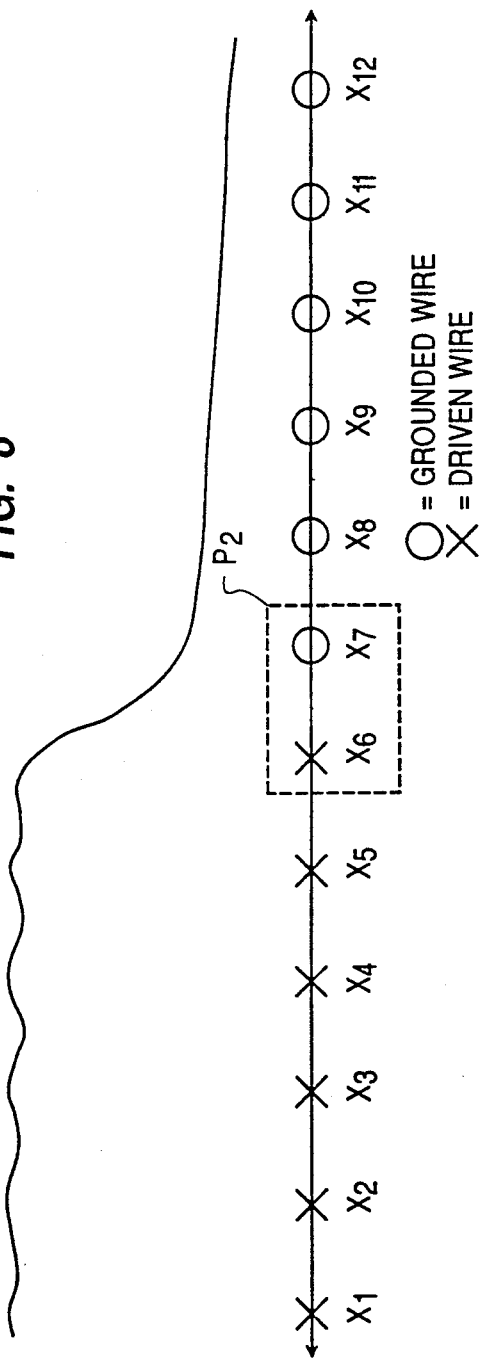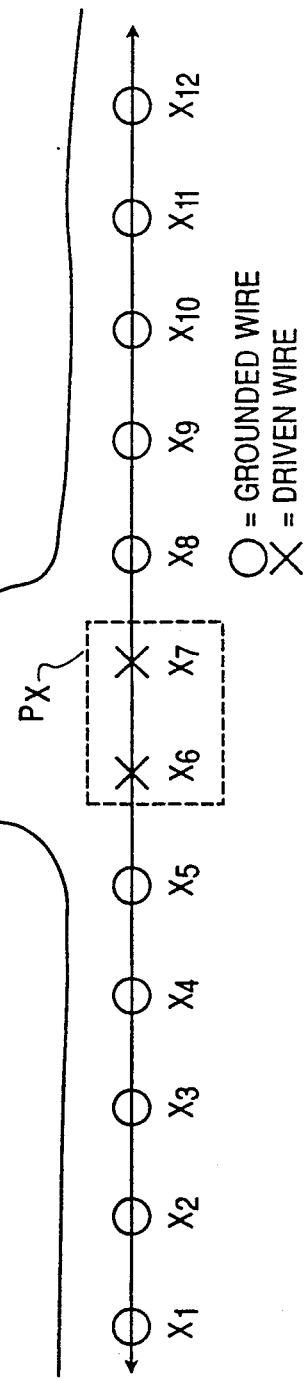

STYLUS SENSING SYSTEM

This application is a divisional of copending application Ser. No. 07/608,062 filed Oct. 31, 1990, now U.S. Pat. No. 5,117,091.

1. Field of the Invention

This invention relates generally to input devices for a data processing system. More particularly, it relates to an improved stylus sensing system for use with an interactive input device disposed on a display surface which permits either finger touch input or stylus input.

2. Background of the Invention

In the past, computers were used only by scientists, mathematicians, and other high-level, sophisticated computer users. As computer technology progressed, and particularly with the advent of the personal computer, data processing has reached every level of society, and every level of user. The trend is for fewer computer users to be computer professionals or sophisticated in data processing techniques. Access to computers will increase even further in the future as computer hardware and software increase in power and efficiency.

It has therefore become necessary to design what have become known in the art as "user friendly" input devices. Such "user friendly" devices are designed to allow an unsophisticated user to perform desired tasks without extensive training. Human factor studies have shown that a device which allows the user to input data directly on the visual display screen of a computer, generally known in the art as a touch input device, achieves greatest immediacy and accuracy between man and machine. One of the first input devices for use at the display surface was the light pen. The light pen is an optical detector in a hand held stylus, which is placed against the face of a cathode ray tube. The location of the light pen is determined by detecting the coordinates of the dot of light which is the scanning raster of the display. A second type of touch input device is a mechanical deformation membrane which is placed over the display screen. The membrane is a transparent overlay which consists of two transparent conductor planes disposed on a flexible surface. When a selection is made, the user mechanically displaces one of the conductor planes to touch the other by a finger or stylus touch, thereby bringing the conductors into electrical contact with each other. Appropriate electronics and software translate the electrical signals generated by the finger or stylus touch to the position on the display surface. Another touch input device is a capacitive transparent overlay placed over the display screen, which includes transparent conductors driven by an electromagnetic signal. The input device can detect the location of a finger touch by the change in capacitance of the overlay or, alternately, a stylus is used to return the electromagnetic signals from the overlay back to the computer to determine the stylus position. Yet another touch input device uses a frame which fits around the display screen having a number of infrared or visible light transmitters and receptors arranged in parallel horizontal and vertical directions. When the user's finger blocks the light beams, the horizontal and vertical receptors note the absence of the signals, thereby locating the position of the action desired by the user.

As such touch input devices have proliferated, there have been many efforts to write user friendly software as well. Recently, graphical user interfaces which have the user point to the screen to select objects and initiate actions have become popular. These graphical user interfaces typically present choices to the user in menu or window form. In addition, recent computer applications use stylus devices for freehand drawing, gesture recognition, and handwriting capture. These new software applications utilize the capabilities of the touch input devices to emulate the familiar ergonomics of a paper and pen to input data into a data processing system. These stylus applications require more precise detection of stylus contact with the screen than do other applications.

A particularly versatile touch input system is described in U.S. Pat. No. 4,686,332, to E. Greanias, et al., entitled "Combined Finger Touch and Stylus Detection System for Use on the Viewing Surface of a Visual Display Device" filed Jun. 26, 1986 which is hereby incorporated by reference. For certain applications, such as selecting items from a list, finger sensing methods have been found more convenient. Where greater precision is required, such as applications with a high information density, or where freehand drawing or handwriting is recognized, the use of a stylus has been found more effective. The touch input system described in the above referenced, U.S. Pat. No. 4,686,332 allows for both finger touch and stylus detection. The system includes a touch overlay sensor which comprises an array of horizontal and vertical transparent conductors arranged on the viewing surface of the visual display device. The conductor array emits electromagnetic signals into the region above the display surface under the control of a microprocessor. The magnitude of these signals is greatest near the surface and grows smaller at greater distances. A stylus "antenna" is connected to an input of the detector control system and senses the signals emitted by the array. The signal amplitude seen by the stylus is related to the position of the stylus on and above the display. Radiative signal measuring means coupled to the stylus measures the electromagnetic or electrostatic signal received by the stylus. Stylus contact with the display surface is indicated when the electromagnetic signal exceeds a prescribed threshold. The accuracy of contact determination depends on the uniformity of the radiated signal across the touch overlay surface.

The system includes a means for connecting the output of an electromagnetic or electrostatic radiation source to selected patterns of horizontal and vertical conductors in the array. A switchable path connected to the I/O terminals of the array selects the plurality of horizontal and vertical conductors that are connected to the radiative source. Control signals applied to the control input of the switchable path determine the conductors that are connected at different intervals of the sensing procedure. The control signal timing is used to interpret the stylus signal amplitude and determine where the stylus is located with respect to the conductor array i: the plane of the display surface. The finger sensing system in U.S. Pat. No. 4,686,332 is also a capacitive measurement means which measures the capacitance of selected conductors and determines where and when a finger touch occurs. The same switchable path is also used to connect the capacitance measurement means to pluralities of horizontal and vertical conductors to the capacitance sensing means in response to control signals applied to the control input.

However, the system as described in U.S. Pat. No. 4,686,332 has a number of drawbacks, particularly with regard to the detection of stylus contact with the sensor screen. For handwriting applications, only the positions of the stylus as it touches the sensor screen should be recorded. For example, the stylus motion after completing the stem of a "t", and before the crossing is begun, must not be recorded, even if the stylus is moved very near the surface of the sensor. Similarly, the stylus motion between the horizontal lines of an equal sign must not be recorded even if the stylus moves very near the surface. With the sensing method as described in U.S. Pat. No. 4,686,332, the stylus would frequently be in sufficient proximity to the touch overlay for positions between strokes to be recorded in the tracking mode. Thus handwriting recognition would have a great number of unintended strokes.

As discussed in U.S. Pat. No. 4,686,332, the conductors in the touch overlay are approximately 0.025 wide and are spaced approximately 0.125 inches center-to-center. When compared to the resolution desired for handwriting, on the order of 250 points per inch, this is a relatively wide spacing. To determine the position of the stylus when it was between adjacent conductors, an interpolation technique was used. This technique assumed that the field varied linearly with position between the two conductors where the second set of three conductors was connected to ground. While this assumption was to determine the stylus position with more than a fair degree of accuracy, it is not true. As the electrical field strength from an individual conductor varies with the distance from the individual conductor, dielectric properties of the materials surrounding the conductor and the location of nearby grounded conductors, the electrical field strength from the multiple driven wires exhibited non-linear characteristics. This effect is more pronounced where the layers in the touch overlay are thin, and thus, the stylus is closer to the individual conductors interpolation technique used.

Lastly, it was found that the attitude of the stylus itself as it was held in the hand of the user had an effect on the location sensed by the system. As mentioned above, the stylus acts as an antenna to pick up the electromagnetic signals radiated by the touch sensor overlay. Depending on the writing angle preferred by an individual user, the signal strengths measured by the system could vary considerably, thus creating errors in the accurate locating of the stylus. Contrary to the assertions of U.S. Pat. No. 4,686,332 in column 6, lines 56-60 the signal strengths can not always be normalized by calculation, as the stylus orientation can change during the stroke across the overlay.

OBJECTS OF THE INVENTION

It is therefore an object of the invention to provide an improved interactive stylus input device for freehand drawing, handwriting, and gestures, that can also be used to select items by finger as well as stylus.

It is another object of the invention to provide very precise contact detection when using the stylus.

It is another object of the invention to provide a stylus and touch sensor display system which is reliable and inexpensive to manufacture.

It is a further object of the invention that to accurately determine stylus location independent of the angle at which the stylus is held.

SUMMARY OF THE INVENTION

These and other objects are achieved by an improved touch input system. The system includes many of the features described in U.S. Patent No. 4,686,332 namely a touch overlay with an array of horizontal and vertical conductors, a control microprocessor, a stylus antenna, a radiative signal measuring means to measure stylus input, a capacitive measurement means to measure finger input, a radiative source to drive the conductors and a switchable path to connect the conductors to the radiative source, the radiative signal measuring means and the capacitive measuring means in response to control commands by the control microprocessor. The present invention provides several improvements over the prior art system. Among the more important are:

a) The stylus sensing procedure has been modified to include a phase that is dedicated to contact detection. In the preferred embodiment, the contact phase connects all the horizontal (x) and vertical (y) conductors to the radiative source. Since all of the surface conductors are connected to the same electrical potential, the electric field above the surface is more uniform in the x and y directions of the display. There are smaller perturbations in the regions directly above conductors versus the regions between the conductors, and the stylus signals show smaller variations with lateral motion. During this phase, signal amplitude becomes an accurate indication of distance above the surface and provides a more precise criterion for contact detection.

b) The perturbations of the signal amplitude at the sensor surface between conductors are measured during the design of a particular overlay structure. These values are stored in two tables, a tracking calibration table and a contact detection calibration table and are used to correct the signal amplitudes obtained during tracking and the contact cycles. The signal deviation at finite displacements within the square formed by horizontal and vertical conductor pairs are recorded at appropriate locations in the table. During the contact phase, the most recently determined x and y locations are used to query the table for the deviation value at that location. It has been found that perturbation patterns in different regions of the sensor are similar enough to allow use of one perturbation correction pattern for the entire surface. Alternatively, the correction magnitude within a square could be determined by using an analytical function that computes the value from a recorded deviation pattern. The signal deviations at finite displacements between two energized conductors are recorded in the tracking calibration table and used during tracking phase to normalize the measured x and y locations.

c) The design of the stylus has been modified to improve the uniformity of signals that occur in use. Users may hold the stylus at different angles with the surface when using it, but they focus on the stylus tip as they write and make selections. Contact and position must be determined independent of writing angle. To meet this need, a sphere is used in the tip of the stylus as the antenna and the sphere is placed centrally with the outside tip diameter. Thus, the stylus angle can change considerably without changing the signal seen by the stylus. To achieve the desired angular independence, proper electrical shielding must be applied to the connection between the sphere and the cable that conveys the signal to the electronics, as well as the cable itself.

d) The x and y deviations of that predicted by the tracking calculations are corrected through the use of a compensation table. The deviations can be determined empirically during the test of the product or can be calculated from theoretical equations which account for the materials in the overlay, thicknesses, conductor spacing and other factors.

The improvements described in this invention do not affect the finger touch sensing capabilities of U.S. Pat. No. 4,686,332, however, a scanning phase has been added to the finger sense mode. The scanning phase does not make finger position any more accurate, but it does narrow the area of the overlay in which the finger position is likely to occur, thus speeding overall process time in the sense mode.

BRIEF DESCRIPTIONS OF THE DRAWINGS

These objects, features and improvements will be better understood with reference to the following figures.

FIG. 1 shows the front view of the overlay used for the detection of touch and stylus position disposed over a flat panel display, the entire assembly being called a touch workpad.

FIG. 2 shows a cross section view of the overlay attached to a flat panel display.

FIG. 3, shows a cross sectional view of an alternate embodiment of the overlay in the system.

FIG. 7 shows the radiative signal amplitude during the PO measurement of conductor pair $X_6$ and $X_7$ of the overlay for stylus detection.

FIG. 8 illustrates the radiative signal amplitude during $P_2$ measurement of conductor pair $X_6$ and $X_7$ for stylus detection.

FIG. 9 shows the radiative signal amplitude during the Px measurement of conductor pair $X_6$ and $X_7$ of the overlay.

DETAILED DESCRIPTION OF THE INVENTION

Figure 4:
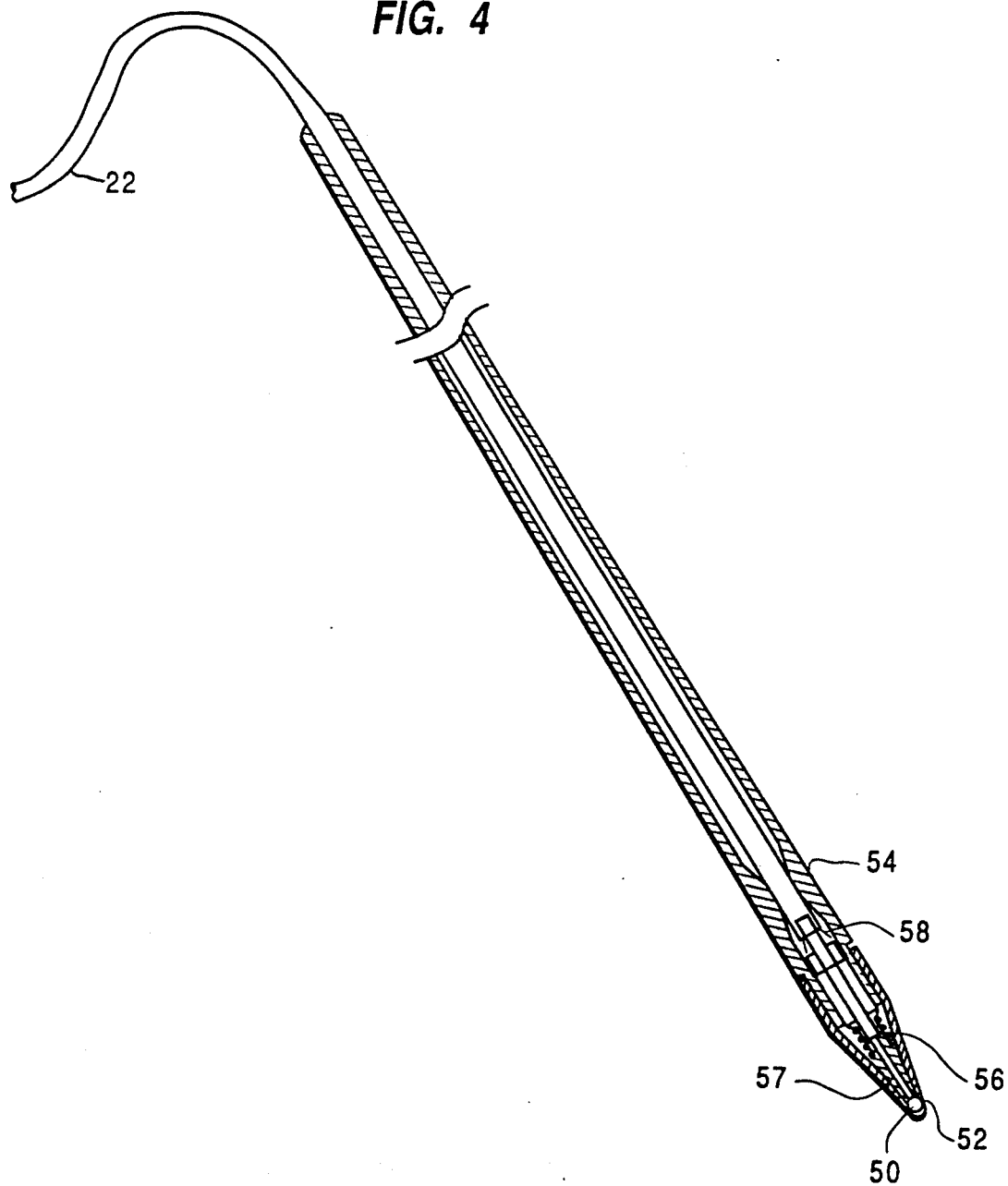
FIG. 4 shows a cross sectional view of the stylus.

Referring to FIG. 1, a touch workpad, substantially similar to that described in copending application Ser. No. 351,227 to Arbeitman, entitled "Flat Touch Screen Workpad for a Data Processing System", filed May 15, 1989, and hereby incorporated by reference, is shown. The workpad 10 comprises a housing 12 having a rectangular recessed window 14 which surrounds the edges of a rectangular touch overlay 16. The overlay 16 is transparent and is disposed on a liquid crystal display (LCD) 18. The overlay 16 consists of a laminate structure including several plastic substrate layers laminated together by means of adhesive layers also including a first plurality of transparent conductors 16A disposed in the horizontal direction and a second plurality of transparent conductors 16B disposed in the vertical direction. Several of the conductors in both vertical and horizontal directions are positioned beyond the recessed window 14 to allow more accurate location determination of the stylus 20 or a finger on the LCD 18 at the edges of the display window 14.

A stylus 20 is connected by cable 22 to the touch workpad. The stylus 20 acts as an antenna to pick up the signals radiated by the overlay 16, and provides much greater resolution than can be provided by a finger touch. The stylus 20 is discussed in greater detail with reference to FIG. 4. Also on the bezel of the housing are four button switches 24–27 which can used to change the mode in which the data from the workpad 10 is received. Workpad cable 28 is the connector between the workpad 10 and the computer with which the user is communicating. The workpad cable 28 provides power to the workpad 10 as well as display signals to operate the LCD 18 and touch signals to operate the overlay in both finger and touch and stylus modes. In addition, the cable 28 is also the conduit to the computer of the measure of the signal received by the stylus 20 and the frequency change due to changes in capacitance due to a finger touch.

Figure 12:
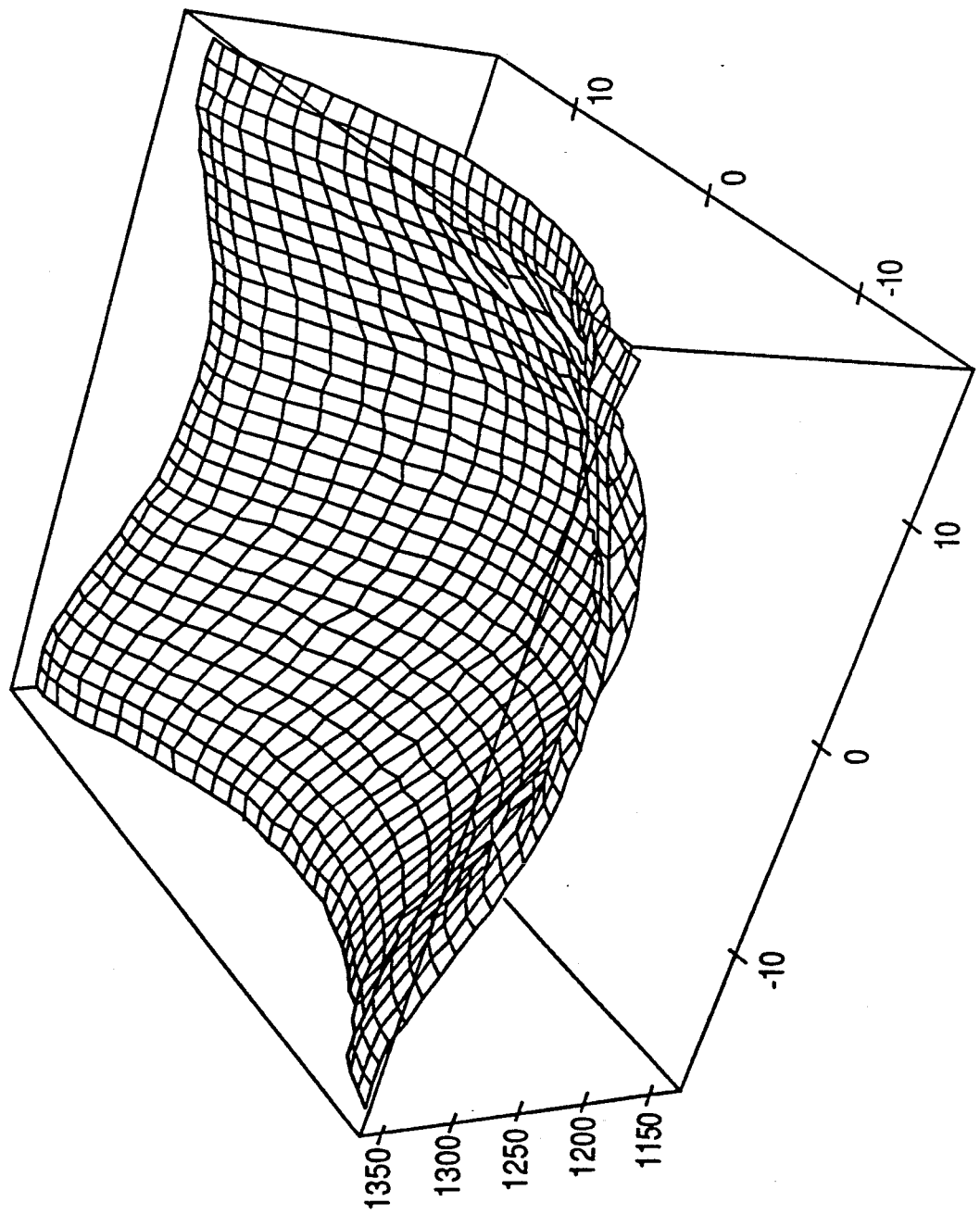
FIG. 12 is a three dimensional representation of the variation in signal amplitude within a square of conductors where all four conductors are driven on both axes.

FIG. 2 shows a cross-sectional view of the overlay 16 positioned on the display surface of the LCD 18. The overlay 16 shown in FIG. 2 is essentially the same as that shown in FIG. 12 of U.S. Pat. No. 4,686,332 and is attached to the glass LCD surface 18 by means of an adhesive 30 to provide a smooth, tight and well supported surface for finger touch and stylus detection. In an alternate embodiment, the overlay 16 would be attached to another piece of glass (not shown) by an adhesive and then mounted to the LCD 18. The overlay consists of the inner substrate 32 which is a sheet of polyethylene terephthalate which is transparent, electrically insulative, and has a thickness of approximately 0.002 inches. An array of horizontal transparent conductors is deposited on the surface of the inner substrate 32 and are designated as Y1, Y2, Y3, etc., with the Y3 wire being shown in FIG. 2. The transparent conductors can be composed of indium tin oxide, for example, which is a well-known transparent conductor material. The thickness of the transparent conductor can be approximately 1000 angstroms. The conductors are approximately 0.025 inches wide and are spaced approximately 0.125 inches on a center-to-center spacing. There are 112 transparent, vertical conductors X1, X2, ... X112 and 112 horizontal conductors Y1, Y2, ... Y112. The horizontal Y conductors on the inner substrate 32 are oriented at right angles with respect to the vertical X conductors deposited on the outer substrate 34. A combined insulation and adhesive layer 36 covers the horizontal Y wires and joins outer substrate 34 and the vertical conductors X and the inner substrate 32 and the horizontal wires Y together. The adhesive insulation layer 36 can be composed of a transparent adhesive such as ultraviolet initiated vinyl acrylic polymer having a thickness of approximately 0.002 inches. The upper portion of the overlay 16 shown in FIG. 2 consists of the outer substrate 34 which is a sheet of polyethylene terephthalate which is optically transparent, electrically insulative and has a thickness of approximately 0.002 inches. Deposited on the surface of the outer substrate 34 is a vertical array of transparent conductors designated X1, X2, X3 ... X6 .... The conductors X1, X2, etc. are also composed of indium tin oxide and have a thickness of approximately 1000 angstroms, a width of approximately 0.025 inches and a spacing of approximately 0.125 inches, center-to-center. The X and the Y transparent conductors can also be composed of gold and silver or other suitable materials. The thickness of the conductors is adjusted to provide resistance below 50 ohms per square and an optical transmission which is greater than 80 percent.

An anti-newton ring coating 38 may be applied to the display side of the overlay 16 to eliminate newton rings when the inner substrate 32 comes into contact with the LCD 18. An electrostatic shield layer 39 consists of a full panel coating of indium tin oxide which is grounded. This coating shields the vertical X conductors and horizontal Y conductors from electrostatic noise generated by the LCD 18. The electrostatic shield layer 39 must be less than 100 ohms per square and must exceed an optical transmissivity of 80 percent. As the LCD 18 is much quieter electrically than the CRT in the prior patent the electrostatic shield layer 39 can easily be omitted. The laminated structure 16 has an overall thickness in the window area 14 of approximately 0.010 inches, has a high optical transparency, and has a durable mechanical quality. In an alternate embodiment, the Y and X array conductors could be deposited on the outer laminate 34 and the inner laminate 32, respectively.

FIG. 3 depicts a cross-section view of a preferred embodiment of the touch overlay used in the system of the present invention. The overlay 16' is quite similar to that depicted in FIG. 2, the major difference being that the vertical conductors X1, X2 ... are on the top side of the upper substrate 34 facing away from the LCD display 18. A top sheet 40 was added to prevent stylus contact with the vertical conductors. An antiglare top coat 42 prevents operator fatigue.

The advantage of an upward facing conductor has to do with the brittle nature of indium tin oxide (ITO) and ITO's relative resistance to compressive forces as opposed to tensile forces. In FIG. 2, the vertical conductors X1, X2, ... face downward toward the display surface 18. When the stylus 20 comes down on the overlay 16, it has the effect of stretching the upper conductors at the point of contact. After repeated contacts, the vertical conductors tend to crack, thereby disrupting electrical conductivity and signal transmission in the overlay 16. In FIG. 3, the vertical conductors X1, X2 ... face upward and when the stylus 20 comes down on the overlay 16', the conductors are compressed. ITO is known to be relatively immune to compression, and therefore the overlay 16' in FIG. 3 is not likely to suffer reliability problems from ITO cracking. In both embodiments of the overlay in FIGS. 2 and 3, the horizontal conductors face upwards and are subjected to compressive forces. However, due to the relative thicknesses of the layers between the stylus and the lower horizontal conductors and the stylus and the vertical conductors, it is less critical that the lower conductors face upwards. In yet another embodiment of the overlay, the upper conductors could face upwards and the lower conductors could face downwards, the lower conductors additionally being protected by the inner substrate. The display surface 18 of the LCD is also more compliant than the hard glass of the CRT disclosed in U.S. Pat. No. 4,686,332. It is thought that the compressive forces would be distributed more evenly with the LCD 18 and the downward facing lower conductors, although under mild tensile forces, would be less likely to crack.

In FIG. 3, the inner substrate 32, the outer substrate 34 and the top sheet 40 are sheets of biaxially oriented polyethylene terephthalate laminated together with a thermoplastic polyester adhesive 36, 44. In a preferred embodiment, the miner substrate 32 is 0.005 inches thick, the outer substrate 34 is 0.002 inches thick and the topsheet 40 is 0.001 inches thick. Adhesive layers 36, 44 measure approximately 0.0005 to 0.001 inches in thickness. As in FIG. 2, the horizontal and vertical ITO conductors are approximately 1000 Angstroms in thickness, with a width of approximately 0.025 inches and a spacing of approximately 0.125 inches, center to center. The overlay 16' is attached 30. Anti-newton ring and electrostatic shield coatings may also be placed between the inner substrate 32 and the LCD 18.

As discussed in U.S. Pat. No. 4,686,332, the overlay X and Y conductors are electrically connected to the other elements of the sensing system by means of several bus wire located at the periphery of the overlay. The requirement of a separate bus wire for each X and Y conductor would rapidly become unwieldy and increase the size, complexity and cost of the overlay.

Therefore, several widely spaced conductors are connected to the same bus wire. In the preferred embodiment above in which there are 112 X conductors and 112 Y conductors, there are 16 X bus wires and 16 Y bus wires. Consequently, when a particular bus wire is energized, electromagnetic signals are entitled by seven different conductors in the overlay.

FIG. 4 depicts the improved stylus structure of the present invention. In U.S. Pat. No. 4,686,332, it was recognized the stylus orientation to the overlay affected the radiative signal amplitude picked up by the stylus. Signal amplitude variation is accounted for in stylus position determination by normalizing the signal strength by calculation. Nonetheless, it is desirable to have the signal amplitude received by the stylus at a given location on or near the overlay to be independent of stylus orientation, particularly for the contact determination measurement discussed below. Signal variation with stylus orientation has an adverse impact to the contact detection phase of the improved stylus detection method. Unlike the position determination calculation, the magnitude of the signal is used without normalization, as the position calculation is the ratio of several signal measurements. Finally, it is easier and ultimately more accurate, not to be required to account by calculation or other means for signal strength variation due to stylus angle.

Referring to FIG. 4, a cross section of the stylus 20 is shown. A sphere 50 acts as the antenna for the stylus. Because of the spherical geometry, the user is free to hold and change the writing angle of the stylus 20 considerably without changing the radiative signal seen by the stylus 20. This arrangement can be made by pressing a ball bearing 50 into a molded plastic tip cover 52. The inner diameter of the hemispherical tip cover 52 is approximately equal to the diameter of the ball bearing 50 (approximately 0.062"). The L outer diameter of the tip cover 52 (approximately 0.095") is a convenient size for pointing and writing. The sphere diameter and tip cover outer diameter were chosen to work with the geometry of the transparent conductors in the touch overlay 16'. Other touch overlay geometries may lead to somewhat different antenna and stylus tip dimensions. As depicted, the ball bearing 50 provides ample signals for position sensing and contact detection. It would be preferred to go to a very small diameter ball to approach a theoretical point source, however, the stylus will not receive a sufficient signal. It is important that both the ball bearing 50 and the tip cover 52 be substantially spherical and concentric with each other for the stylus to be used at angles between normal and 45 degrees with little effect on the detected signal strength.

The stylus tip cover 52 fits into a hollow tube 54 which is similar in dimension to a conventional ball point pen. The inner conductor of stylus cable 22 passes through this tube 54 from the sphere 50 to the electronics in the workpad 10. In a preferred embodiment, a helical spring 56 is used to press the ball bearing 50 into the tip cover 52 and to make the inner conductor of the cable 22 make electrical contact with the ball 50. Those skilled in the art can conceive of other methods of electrically connecting the wire to the ball. Cylindrical shielding 58 is an electrically conductive tube within the tube 54 connects to the spring 56 and confines the signal sensitivity to the sphere antenna 50. Between the spring 56 and the ball 50 is a plastic insulator 57 used to isolate the ball 50 from the shield 58 and to press the ball 50 into the tip cover 52. The plastic insulator 57 should be of a relatively hard plastic which will not allow the wire of the spring 56 or ball 50 to be embedded therein. The construction cost of the depicted stylus should be a minimum as no soldering or other costly assembly methods are required.

The method for determining stylus position is improved over that disclosed in U.S. Pat. No. 4,686,332. In the stylus mode, the X and/or Y conductors are driven by a 40 KHz oscillator driver so that the X and/or Y conductors act as a transmitter of electromagnetic radiation. The stylus 20 acts as a receiver of the signal. The signal amplitude is digitized and analyzed by the control microprocessor, the stylus detection process consists of several operational modes which are discussed below. The differences between the improved procedure and U.S. Pat. No. 4,686,332 are discussed below.

Figure 5:
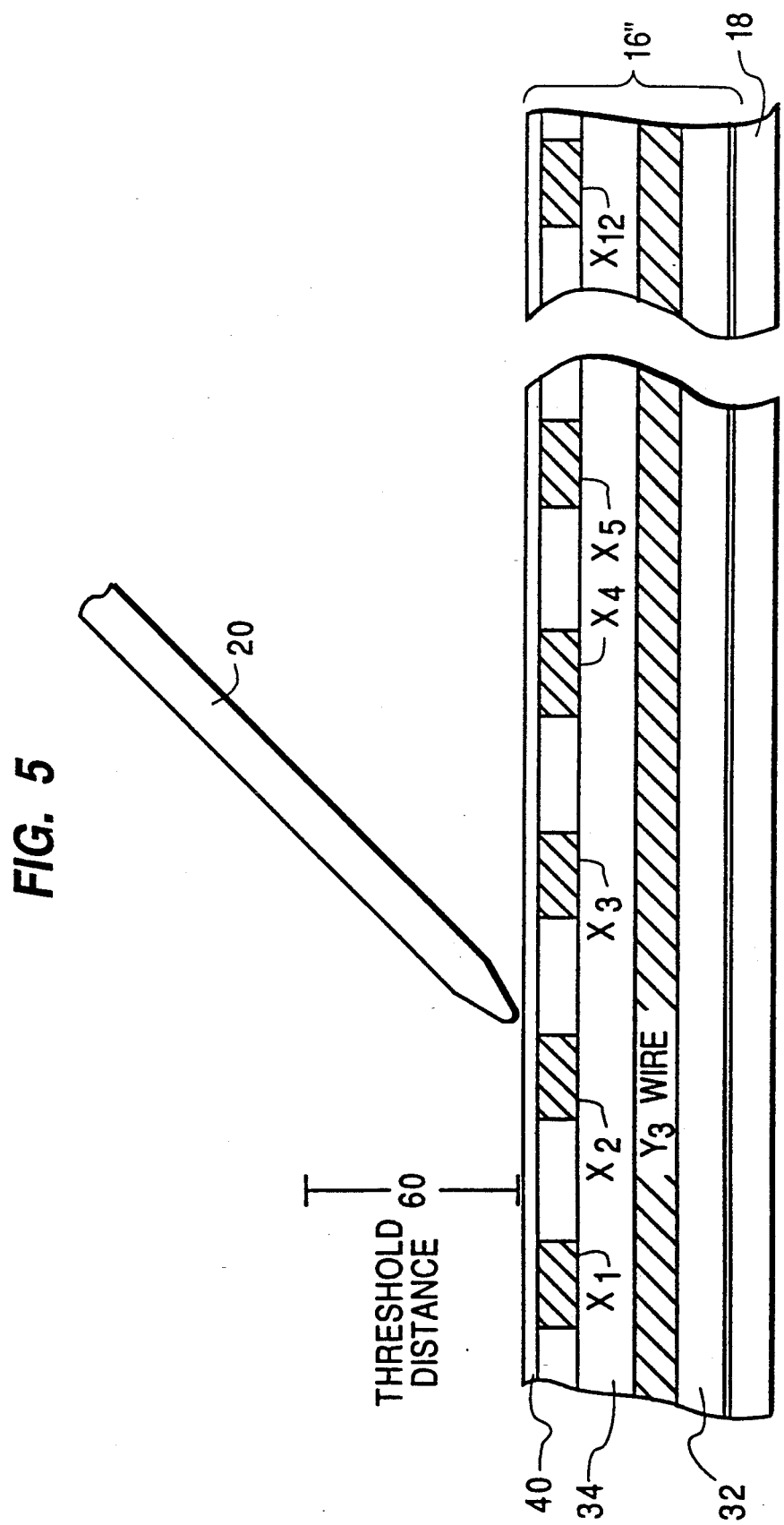
FIG. 5 illustrates the overlay as it is used for stylus detection.

FIG. 5 depicts the arrangement for detection of the stylus 20 when it is closer than the locate threshold distance 60. Initially, the touch system is in idle mode. The idle mode is used to determine whether the stylus is close enough to the overlay 16 for location determination. In the preferred embodiment, all of the conductors in the overlay, on both axes, are driven, and the signal strength received by the stylus is compared to a threshold. If the signal exceeds the threshold, the Locate Mode discussed below is invoked. In addition, the Sense Mode, which detects finger location in U.S. Pat. No. 4,686,332 is excluded. This exclusion allows users to put their fingers and hand directly on the overlay 16 for better support and control while using the stylus. The overlay 16" depicted in FIG. 5 is similar to the overlay 16' depicted in FIG. 3, except that the adhesive layers are not shown for the sake of clarity.

In the locate mode, the system first tries to determine the X and Y conductors nearest to the stylus location. The locate operation starts by driving individual sets of wire on each axis separately and collecting the associated signal strengths from the stylus. The exact driver pattern for the locate mode depends on the structure of the overlay 16 and whether the overlay 16 is disposed over a CRT or an LCD. If the overlay 16 is on a CRT, an electrostatic shield layer will be used to damp the electrical noise from the CRT. The electrostatic shield layer has the additional effect of driving the ITO conductors to ground and reduces the signal strength of the electrical signal emitted by the overlay. With the electrostatic shield, only signals from the very nearest conductors will be sensed at all by the stylus. These signals will be used to determine the conductors driven in the following mode. If the overlay 16 is on an LCD, an electrostatic shield layer is generally not used. The stylus will pick up signals from many more conductors. Where there is no electrostatic shield layer, it has been determined that the three highest signal amplitudes observed when the sixteen X bus wires are driven on the X-axis will be sufficient to identify the X conductor pair nearest the stylus position. Likewise, the three highest signal values for the Y-bus identify the nearest Y conductor pair to the stylus position. If both axes successfully locate the "nearest" conductors, the system will initiate the track mode of operation to determine the stylus position more precisely. Track mode requires larger signal amplitudes and if after successive tries, the signal conditions are not adequate, the system returns to locate mode, described above. The procedures for transferring between modes are some of the changes from U.S. Pat. No. 4,686,332.

If more than prescribed number of successive, successful locates occur and all the locate coordinates are proximate to each other, the locations of these points are reported to the computer. These indicate the general X and Y locations of the stylus when it is some distance above the surface and not in contact with the sensor. By determining this "base" location and reporting it to the system, the computer can create a pointer image (i.e. a cursor) on the display. This feedback to the user provides significant help to the user doing fine drawings and handwriting.

The previous art disclosed in the referenced patent utilized a single stylus signal threshold for entering into locate and tracking modes. Because both the locate and track modes are expected to succeed at this point, the threshold had to be set very conservatively. The present design allows the reporting of proximity points when Locates have succeeded but Tracking has not, thus providing points while the stylus is considerable higher off the display. It also allows the system to exclude finger sense operation and concentrate on stylus location determination much sooner.

The method disclosed in the referenced patent utilized a fixed threshold for determining whether the track mode measurement was successful and should be continued. This had two detrimental effects. First, a threshold value had to be manually selected based upon an a priori analysis of the stylus signals. Secondly, the threshold was not adaptive to changes in the equipment, such as the user replacement of a stylus. The present design compares the various stylus signals detected while in track mode, and depending on the ratio of the PX measurement to the PO and P2 measurements determines whether the measures were valid.

The track mode is initiated when the current nearest conductors or "base position" has been determined in locate mode. Only groups of conductors immediately adjacent to the base position are driven in track mode. In the improved method of the present invention, each track mode cycle includes a separate contact detect operation as well as wire drive operations and offset calculations from the base position.

Seven different overlay wire drive patterns are generated during track mode and seven corresponding signal amplitudes are collected. The first three drive patterns are applied to the X axis and are used to determine the offset of the pen from the X base position. The fourth pattern is a simultaneous drive of all X and Y conductors, and is used to evaluate the altitude of the stylus above the overlay. The last three drives are applied to the Y axis and are used to determine the offset of the pen from the Y base position.

Figure 6:
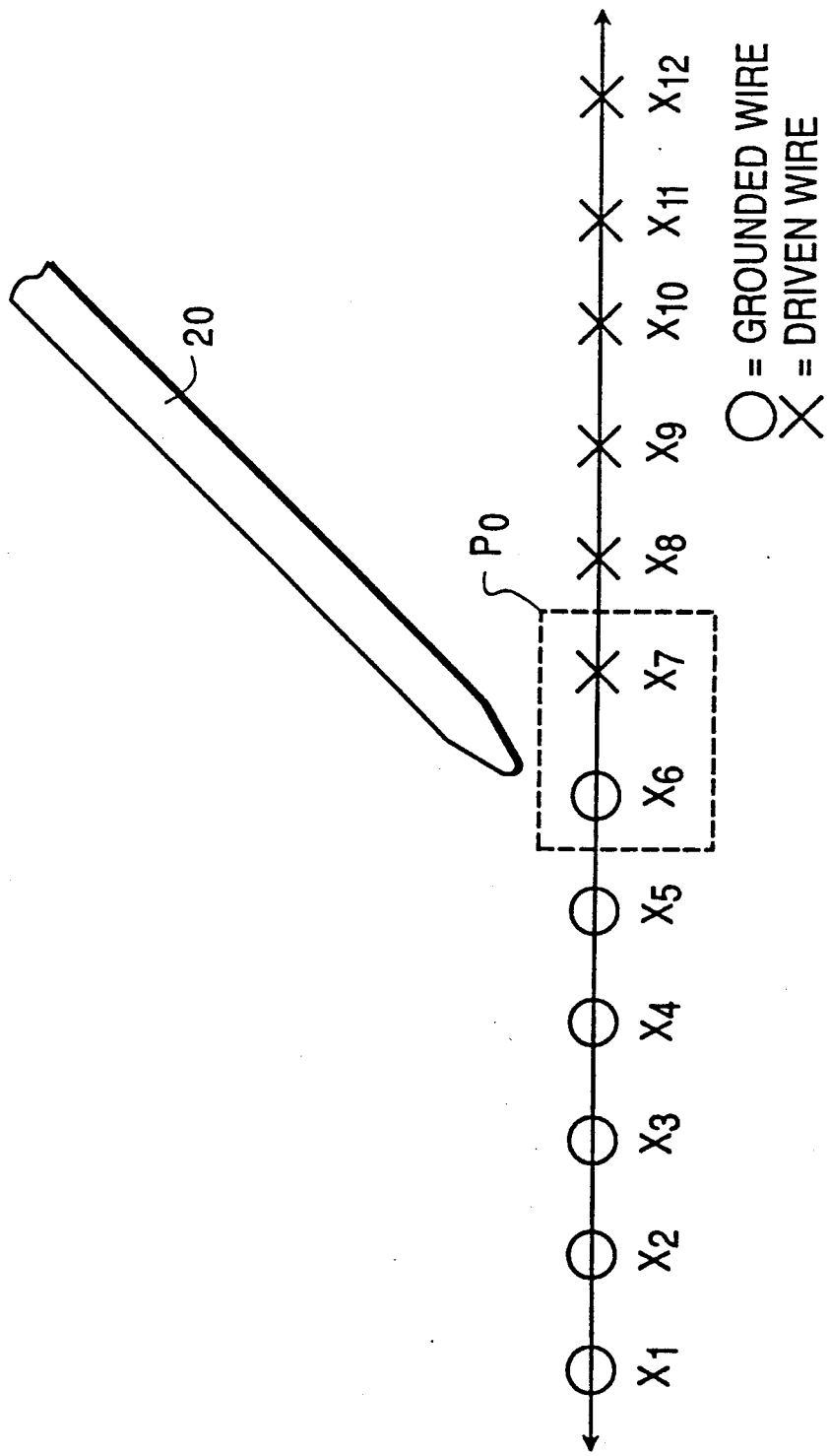
FIG. 6 is a schematic view of the overlay as it is used for stylus detection during one of the stylus tracking measurements.

The first drive pattern for the X conductors for determining the stylus position in track mode is schematically shown in FIG. 6. A base wire pair is defined as two adjacent conductors between which the stylus is believed to lie. In FIGS. 6 to 9, adjacent conductors $X_6$ and $X_7$ are driven in three different patterns. When conductor $X_6$ and the five conductors to the left are connected to ground, and right conductor $X_7$ and the five conductors to the right are connected to the oscillator, as in FIGS. 6 and 7, the drive pattern is defined as P0. When left conductor $X_6$ and the five conductors to the left are driven by the oscillator and right conductor $X_7$ and the five conductors to the right are grounded, the drive pattern is identified as P2. When both of the two conductors are driven, the pattern is identified as PX. The drive patterns P0, P2 and PX are shifted to the current position as the stylus is moved In the improved method, twelve conductors are in the drive patterns (6 grounded, 6 driven) rather than six in the method described in U.S. Pat. No. 4,686,332. The P1 pattern of the U.S. Pat. No. 4,686,332 has been replaced by pattern PX. Drive pattern PX is used to normalize the P0 and P2 signal measurements to reduce the impact of the stylus altitude or positions determination. Experimentally, PX has been shown to provide better normalization than the previously used method. In general, the more conductors driven, in this case those to the right of $X_7$, the more uniform the electrical field over the driven conductors. There is a point of diminishing returns, however, in that ever greater numbers of driven conductors require the multiplexing circuitry which connects the connectors to the electronic circuitry to be increasing complicated.

FIG. 7 shows the amplitude of the signal received by the stylus 20 as it would pass from left to right from above the conductor $X_l$ to a position above the conductor $X_{12}$. Note that within and around the wire pair $X_6$ and $X_7$, the stylus signal varies somewhat linearly with position. The degree to which the signal strength curve approximates linearity depends in part on how far the stylus 20 is from the conductors. For this overlay, the signal strength curve is much less linear and any calculations based on linearity must be compensated. Also shown in FIG. 7 is the slight ripple in the signal strength curve over the driven conductors $X_7$, $X_8$, $X_9$, $X_{10}$, $X_{11}$ and $X_{12}$. The signal strength is slightly stronger directly over a driven conductor than it is between two driven conductors. The first phase in the locate mode is measuring the signal amplitude using drive pattern P0. Assuming that the stylus 20, is located somewhere between $X_6$ and $X_7$, the signal amplitude measured by the stylus 20 will be a single value along the sharp rise of the curve depicted in FIG. 7.

The second pattern in the operation of tracking the position of the stylus 20 is shown in FIG. 8, where the drive pattern P2 is the inverse of the wire pair P0. That is, the conductors $X_1$, $X_2$, $X_3$, $X_4$, $X_5$ and $X_6$ are driven with the oscillator driver, whereas the conductors $X_7$, $X_8$, $X_9$, $X_{10}$, $X_{11}$ and $X_{12}$ are connected to ground or reference potential. The signal amplitude as the stylus 20 moves from left to right across the conductors is shown for the drive pattern P2 in FIG. 7. The stylus 20 is in the same position as for FIGS. 6 and 7, therefore, the magnitude of the signal for the wire pair P2 will be measured somewhere along the sharp fall between conductors $X_6$ and $X_7$ as shown in FIG. 8. Similar to FIG. 7, there is a ripple in signal strength over the driven conductors $X_1$, $X_2$, $X_3$, $X_4$, $X_5$ and $X_6$. As the stylus 20 gets closer to the conductors in the overlay 16, the ripple over the driven conductors becomes more accentuated and the rise or fall in the signal strength between conductors $X_6$ and $X_7$ becomes less linear.

The third phase of track mode is depicted in FIG. 9. This phase is unlike any of those described in the prior art patent. During this phase, both conductors $X_6$ and $X_7$ are driven by the oscillator and all other conductors are grounded. FIG. 9 depicts the signal strength curve which would be measured as the stylus 20 is moved across the overlay 16 from $X_1$ to $X_{12}$. The curve is bimodal with the two modes occurring directly over the driven conductors and the closer the stylus is to the overlay the more pronounced the bimodal nature becomes. Since the PX patterns only drive two conductors, the electric field above the surface more nonuniform in the X and Y directions of the sensor and the stylus signals show larger variations with lateral motion.

Figure 10:
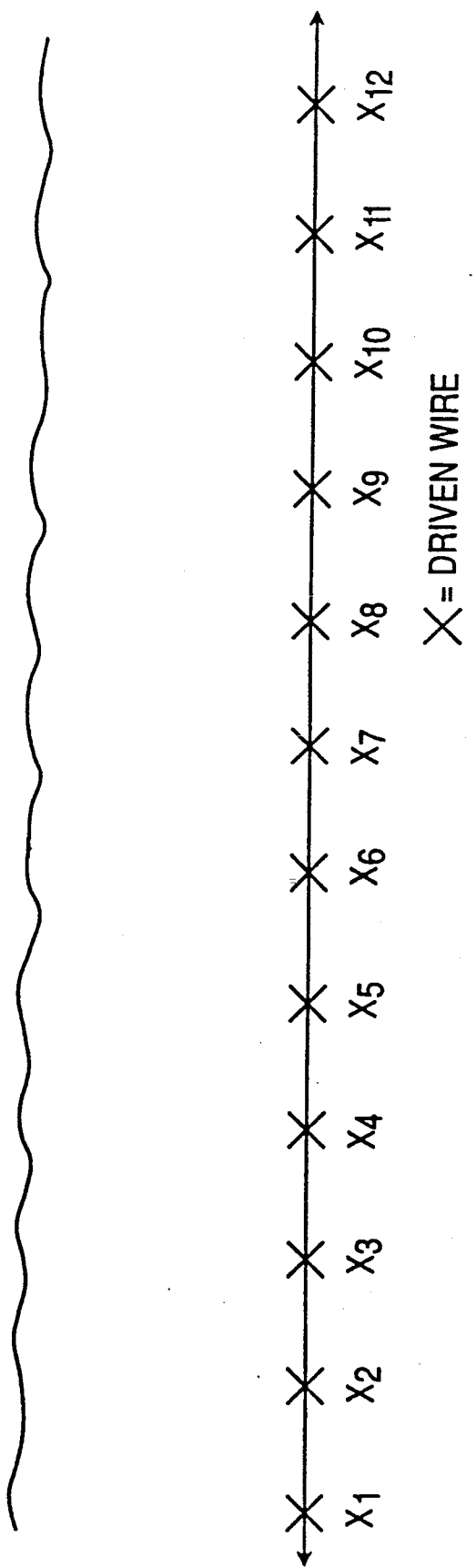
FIG. 10 depicts the radiative signal from the overlay during the contact detection phase of the stylus detection.

FIG. 10 depicts the fourth drive pattern in the track mode where all the X and Y conductors in the overlay are driven simultaneously for contact detection. While other drive patterns could be used for stylus detection, driving all the conductors creates the most uniform signal across the overlay. This pattern is used to evaluate the height of the stylus above the display surface and is distinct from the other patterns of the track mode in that conductors far from the base position are driven. By driving all of the conductors, very accurate height determination is possible as the electrical field varies very slightly with lateral position as can be seen in FIG. 10.

Figure 11:
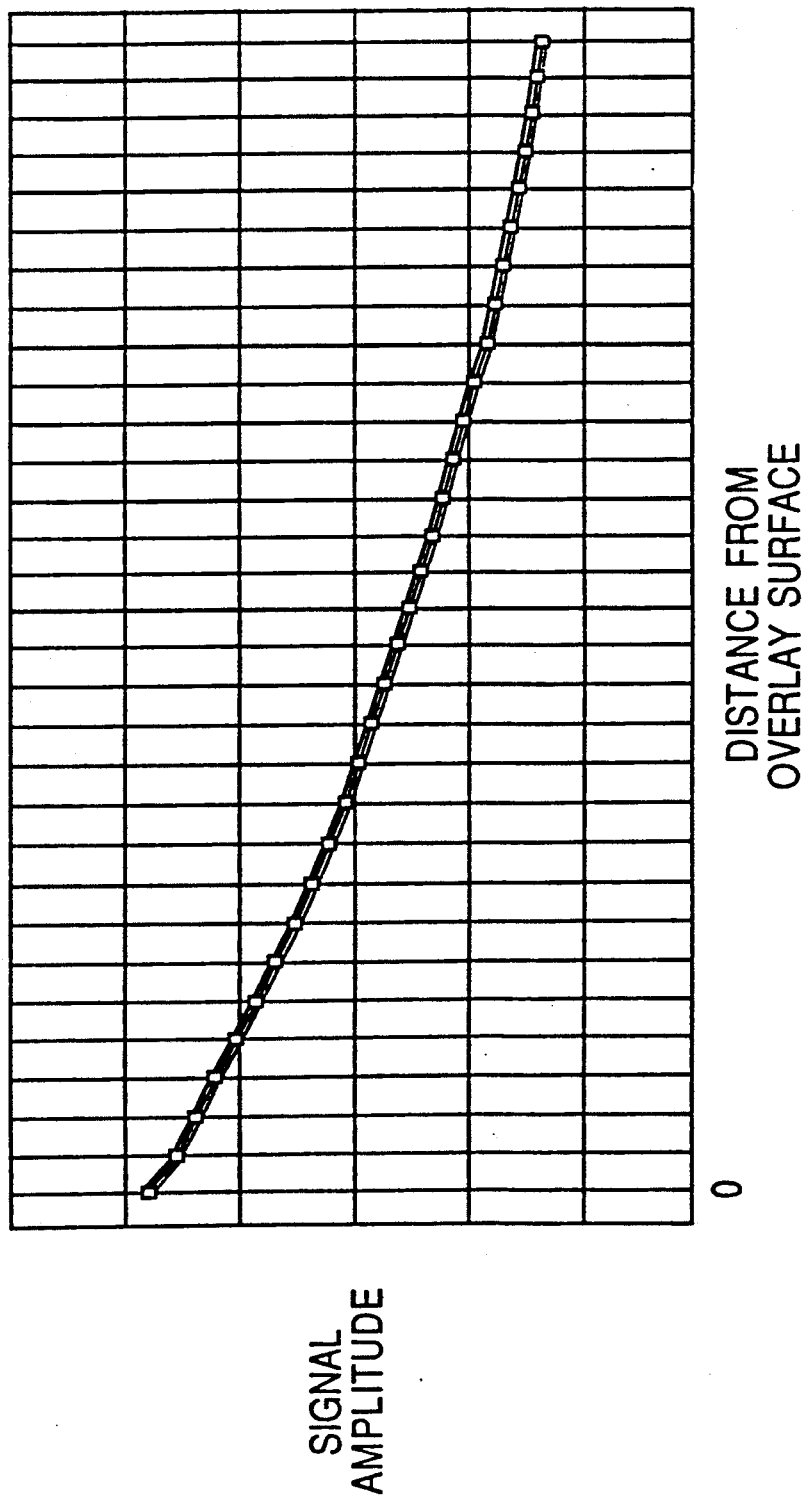
FIG. 11 show the relationship between radiative signal amplitude and distance from the overlay surface during the contact determination phase.

FIG. 11 depicts the relationship between signal amplitude and distance from the overlay surface. If the signal amplitude is less than predicted for contact with the touch overlay surface, the sensed positions are not recorded as contact points, but as proximity points by the improved stylus sensing system. The figure depicts signal amplitude over a single point in the overlay as the signal amplitude is strongest where the conductors are closest to the electrical bus and weakest at the conductor termination furthest away from the bus. The next three drive patterns are essentially the same as depicted in FIGS. 7, 8 and 9, but for the conductors, for example, $Y_1$, $Y_2$, ... $Y_{12}$. $Y_6$ and $Y_7$ are the two conductors between which the stylus is located and around which drive patterns P0, P2 and PX for the Y conductors.

By this point, the locate and tracking mode of stylus has determined the base position of the stylus. The base position is defined as the central point between the two X conductors and the two Y conductors between which the stylus is located. In the preceding FIGS., the base position is the central point between X conductors $X_6$ and $X_7$ and Y conductors $Y_6$ and $Y_7$ on the overlay. Next, a series of compensation or calibration steps are taken to account the nonlinear nature of the signal strengths for the various drive patterns across the overlay. These calibration steps are derived empirically for a particular overlay and stylus combination, although the values in the tables might be theoretically calculated. Those skilled in the art will appreciate that other calibration methods may be possible. First, the offset to the base position is calculated in both X and Y directions.

The offset of the stylus relative to base position is calculated with the signal values collected during the P0, P2, PX operations for each axis. The square area bounded by conductors $X_6$, $X_7$, $Y_6$ and $Y_7$ is called the base region. In the preferred embodiment, the base region is divided into 32 sections, so an offset from $-16$ to $+16$ is reported. The coordinate value for each axis is computed as:

$$\text{coordinate value} = (32*\text{base}) + \text{offset}$$

After the coordinate value is established, it is multiplied by the wire pitch to obtain the position in the overlay. The offset is non-linear function of the P0, P2, and PX values. However, the track algorithm assumes that the function is linear, calculating the offset as:

$$\text{offset} = C*(P0-P2)/PX$$

and adjusts for the non-linearity by mapping the offset through the use of a compensation table. The offset generated by the above equation is 1/64 of a wire distance, twice the reportable density. The compensation table for the X and Y positions is a one dimension vector with 64 values which corrects for nonlinearity in the offset calculation and converts to an offset from $-16$ to $+16$. If the offset is calculated by the above equation to be $+28$, the system will look at the 60th value in the vector. The vector may indicate that the stylus is really on offset 13 rather than 28, so the value of 13 is substituted into the equation to determine the coordinate value. The referenced patent does not compensate for the nonlinearities in the offset calculation. These nonlinearities are due to the shapes of the signal strength curves PX, P0, and P2 as a function of offset location. Although the compensation is performed using a table, one could develop an equation to perform this function.

Next as the X and Y positions have already been determined the distance from the point where the X and Y buses meet, the point of the strongest signal, and the current stylus position is known. This distance is substituted in the equation:

$$\text{Signal strength}_{\text{adjusted}} = \text{signal strength}_{\text{measured}} + K*(\text{distance} \times \text{Signal strength measured})$$

to obtain the intermediate adjusted signal strength for use with the contact detection determination.

Finally, the variable signal strength within the base region bounded by the four driven conductors surrounding the current stylus position is compensated. The nonlinearity in the dual drive mode used for contact detection is illustrated by the three dimensional diagram in FIG. 12. The vertical dimension depicts signal amplitude and the two horizontal axes depict the $-16$ to $+16$ offset divisions. As shown in the figure, the weakest signal is measured at the base position and the strongest signal is measured where the conductors cross. The strength of the stylus altitude signal has been found to be not only a function of the altitude, but also the X and Y delta from the base location i.e., the location between the transparent conductors. While the variations are not as great with the Dual Drive signal discussed above as it was with the prior art, further improvements in contact detection accuracy are achieved using the 2 dimensional compensation table. The offset compensation table is a function of the stylus geometry and overlay geometry and is shown below.

As the X and Y coordinates have been calculated, the relative stylus altitude is computed from the dual drive value collected in the middle of the drive sequence. Since the measurement value has a small dependence on the X, Y location as well as altitude, it is also corrected by using a 2 dimensional (X,Y) compensation table. Using the adjusted signal strength value and the value in the 2 dimensional compensation table, based on current stylus position the final adjusted signal strength is found with the following equation:

$$\text{S. strength}_{\text{final}} = \text{S. strength}_{\text{adj}} + K_2 \frac{(\text{S. Strength . Table }(x,y))}{\text{adj}}$$

The final signal strength value is compared to a "contact" threshold. If the value exceeds the threshold, the coordinates generated for that cycle are tagged "in contact" coordinates. Otherwise they are tagged "proximity" coordinates. When the track cycle is completed, the coordinates, the tag and the corrected amplitude are passed to the computer system.

Figure 13A:
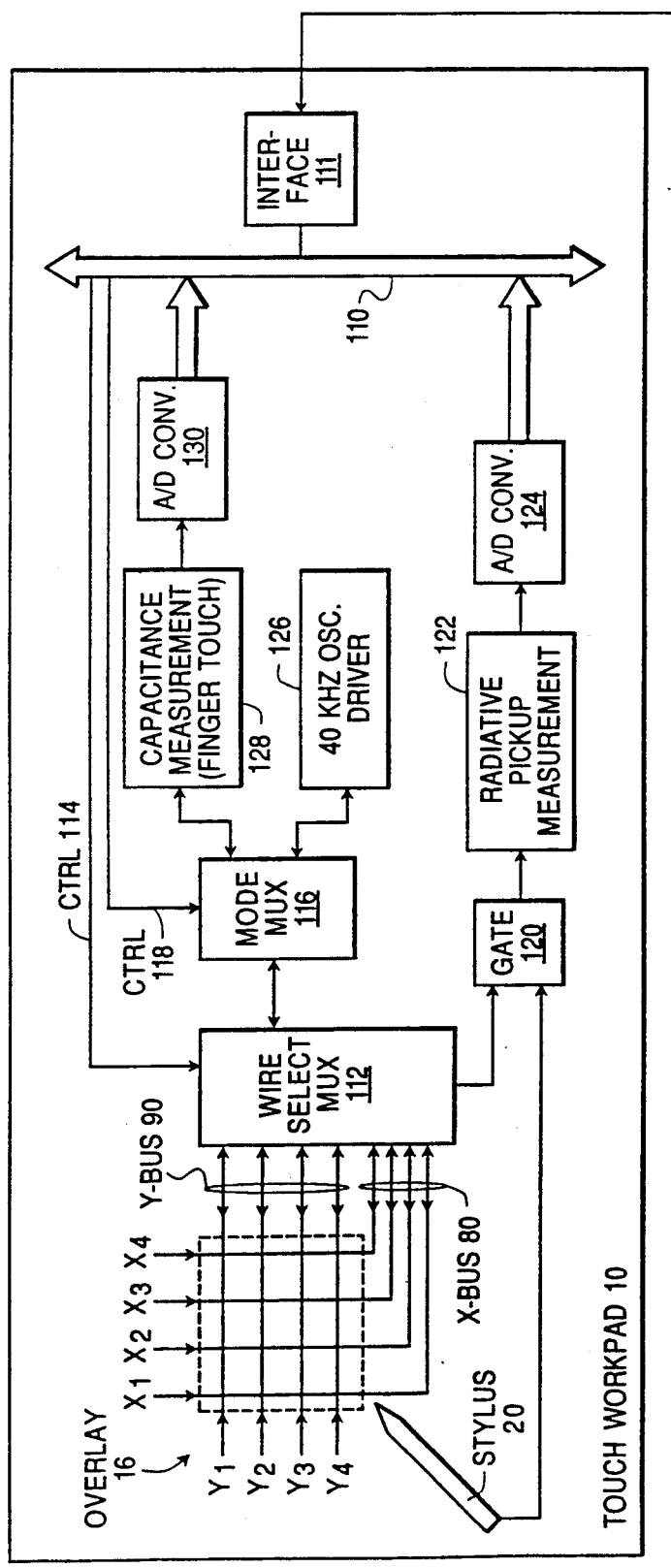
FIGS. 13A and 13B depicts an architectural diagram of the improved stylus and finger touch sensing system
Figure 13B:
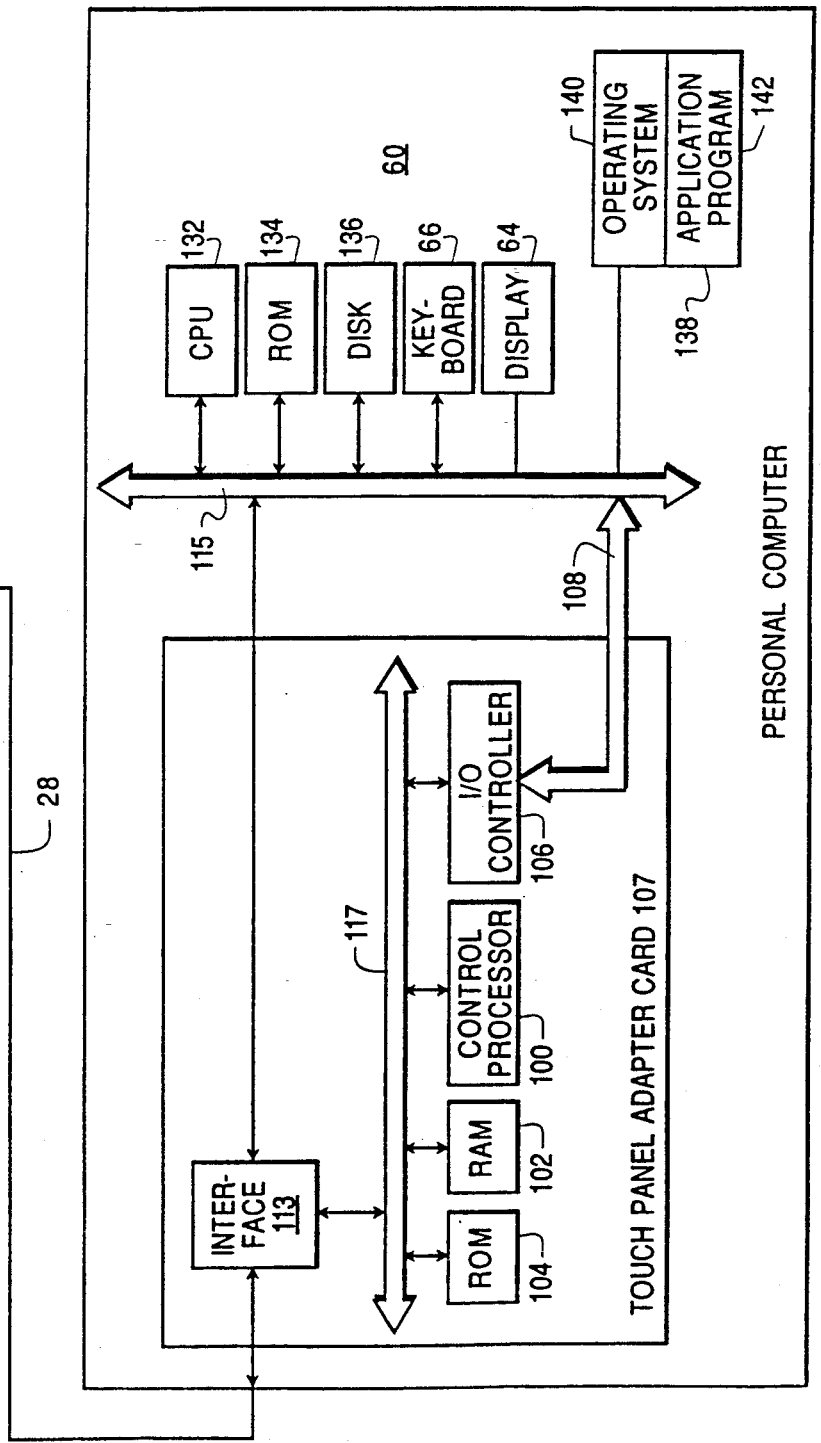

FIG. 13 shows an architectural diagram of the improved detection system. The system depicted in FIG. 13 is very similar to that disclosed in the U.S. Pat. No. 4,686,332 in FIG. 2. The major differences include: the overlay 16 preferably has both X and Y conductor sets facing upward away from the display, the stylus 20 is of the improved design depicted in FIG. 4, the touch control processor 100, random access memory 102, read only memory 104 and the I/O controller 106 are on a touch panel adapter card 107 in a personal computer while the rest of the touch electronics are integrated in the touch workpad 10. As discussed in connection with FIG. 1, the touch workpad 10 communicates with the personal computer and touch panel adapter card via cable 28. The vertical conductors X1–X112 are connected through the X bus 80 to the wire select multiplexer 112 and the horizontal Y conductors Y1–Y112 are connected through the Y bus 90 to the wire selection multiplexer 112. The radiative pickup stylus 20 is connected through the gate 120 to the radiative pickup measurement device 122. The wire selection multiplexer 112 is connected through the mode multiplexer 116 to the capacitance measurement device 128 which is used for capacitance finger touch detection. The wire selection multiplexer 112 is also connected through the mode multiplexer 116 to the 40 kilohertz oscillator driver 126 which is used to drive the X bus 80 and the Y bus 90 for the stylus detection operation. The mode multiplexer 116 also has an enabling output to the gate 120 to selectively connect the output of the stylus 20 to the radiative pickup measurement device 122, for stylus detection operations. The output of the capacitance measurement device is connected through the analog-to-digital converter 130 to the workpad bus 110. The output of the radiative pickup measurement device 122 is connected through the analog-to-digital converter 124 to the bus 110. A control input 114 to the wire selection multiplexer 112 is connected to the bus 110 and the control input 118 to the mode multiplexer 116 is connected to the bus 110.

The workpad bus 110 is connected via workpad interface 111 to the cable 28 which connects to PC interface 113 in the touch panel adapter card 107 in the personal computer. The PC interface 113 communicates to the main system bus 115 and to the adapter card bus 117. The I/O controller 106 has an I/O bus 108 which connects to the main 115 bus of the Personal Computer. The I/O controller 106 is also connected to adapter card bus 117. The bus 117 also interconnects the control processor 100 with the read only memory (ROM) 104 and the random access memory (RAM) 102. The personal computer includes standard devices such as a CPU 132, ROM 134, disk storage 136, a memory 138 which stores operating system 140 and application program 142, a keyboard 144 and display 146.

The wire selection multiplexer 112 and the mode multiplexer 116 connects selected patterns of a plurality of the horizontal and vertical conductors in the overlay 20 to either the capacitance measurement device 128 or the 40 kilohertz oscillator driver 126, in response to control signals applied over the control inputs 114 and 118 from the bus 110 by the control processor 100. During finger touch operations, the capacitance measuring device 128 has its input coupled through the mode multiplexer 116 and the wire selection multiplexer 112 to selected ones of the horizontal and vertical conductors in the overlay 16 in response to control signals from the control processor 100. The output of the capacitance measurement device 128 is converted to digital values by the converter 130 and is supplied over the bus 110 to the control processor 100, which executes a sequence of stored program instructions to detect the horizontal array conductor pair and the vertical array conductor pair in the overlay 16 which are being touched by the operator's finger.

In the stylus detection mode, the 40 kilohertz output of the oscillator driver 126 is connected through the mode multiplexer 116 and the wire selection multiplexer 112 to selected ones of the conductors in the overlay 16, in response to control signals applied over the control inputs 114 and 118 from the control processor 100. The electromagnetic signals received from the overlay 16 by the stylus 20 are passed through the gate 120 to the radiative pickup measurement device 122, which measures those signals and provides an output which is digitized by the converter 124 and output to the control processor 100. The control processor 100 executes a sequence of stored program instructions to detect the proximity of the stylus to the overlay 16 in the proximity detection mode and then to locate and track the horizontal and vertical position of the stylus with respect to the overlay 16 in the location and tracking mode. The stored program instructions for carrying out these operations can be stored in the read only memory 104 and/or the RAM 102, for execution by the control processor 100. Positional values and other result information can be output through the I/O controller 106 on the I/O bus 108 to the host processor for further analysis and use in applications software.

Figure 14:
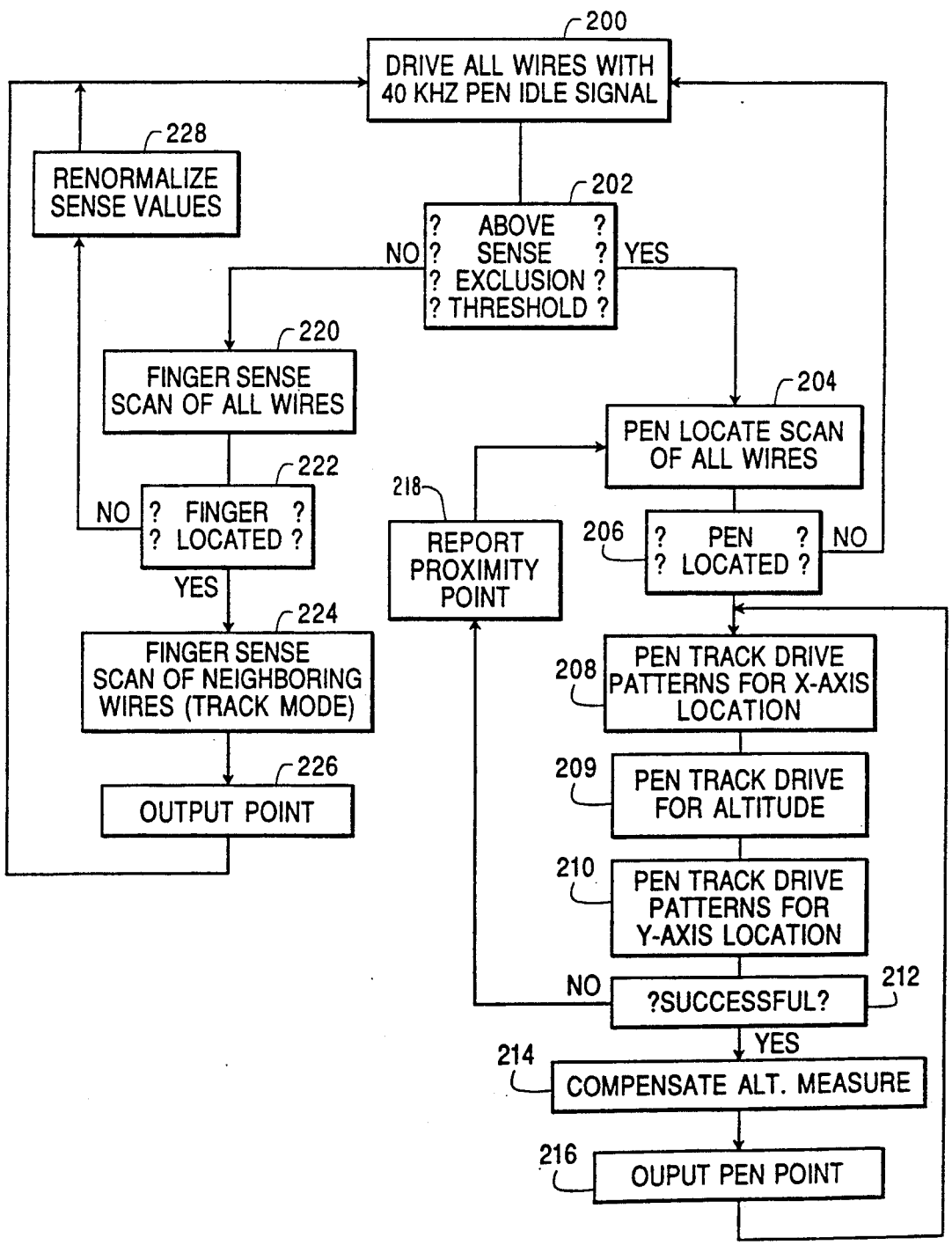
FIG. 14 is a flow diagram of the improved stylus and finger touch sensing method which includes the dedicated contact detect cycle.

FIG. 14 is a flow diagram of a the preferred embodiment of the invention where either finger touch operations or alternately stylus detection operations can be carried out. It has been found that there are very few circumstances in which a user wants to carry out finger touch operations to the exclusion of stylus detection when the stylus is proximate to the overlay. On the other hand, much of the time a user will rest his hand on the overlay while writing with the stylus so the capacitance changes in the overlay due to the user's hand must be excluded while the stylus is sensed.

The flow diagram begins with all the conductors in the overlay 16 being driven in idle mode in step 200. Idle mode is the mode in which the sensing system is typically placed by the controller processor 100. Appropriate control messages are sent to the wire select multiplexer 112 to drive all X and Y conductors via the X-bus 80 and Y-bus 90 and to the mode multiplexer 116 to send all radiative signals captured by the stylus 20 back to the control processor 100 through the gate 120 radiative pickup measurement device 122 and A/D converter 124. In idle mode, the mode multiplexer 116 also connects the 40 kilohertz oscillator 126 to the overlay 16 through the wire select multiplexer 112.

If a signal amplitude above the finger sense exclusion threshold is sensed in step 202, stylus detection steps 204 through 218 are attempted. If the signal amplitude is below the threshold, finger sense steps 220 through 228 are attempted.

If the threshold has been crossed, the sensing system transfers to stylus locate mode in step 204. In locate mode, the control processor 100 sends the appropriate control messages to the wire select multiplexer 112 to selectively connect each of the X and Y conductors to the 40 kilohertz oscillator 16 in the locate driver pattern. The signals received by the stylus 20 are sent back to the control processor 100 in an attempt to identify the two conductors in both X and Y planes which return the highest signal amplitude, and therefore, the conductors which are closest to the stylus 20. If the control processor 100 is successful in locating the stylus 20 over a predetermined number of locate scans in step 206, the stylus sensing system passes into track mode in steps 208 through 216. If the stylus is not located in step 206, the sensing system returns to idle mode, step 200.

In track mode, the wire select multiplexer 112 receives control messages from the control processor 100 to drive the twelve X conductors closest to the stylus 20 in the drive patterns depicted in FIGS. 7, 8 and 9 in step 208. Next, in step 209, all the conductors are coupled to the oscillator 126 to determine whether the stylus 20 is contact with the overlay 16 as described in conjunction with FIGS. 10 and 11. The wire select multiplexer 112 then receives control messages to drive the twelve Y conductors closest to the stylus 20 in drive patterns analogous to those depicted in FIGS. 7, 8, and 9 in step 210. The signal amplitudes received by the stylus 20 are sent back to the control processor 100. In step 212, the P0, P2, PX and Altitude signals are evaluated to determine whether the stylus 20 was in contact with overlay 16, the calculated stylus position is compensated by the above mentioned calibration tables to correct for the nonlinearity of the electrical field over the overlay 16 in step 214. In addition, the measurement step 209 is compensated for nonlinearity. The calibrated pen point is output by the control processor along bus 117 either to RAM 102 for storage or to I/O controller 106 for output to the personal computer along the I/O bus 108. After the stylus position is successfully tracked, the system goes back to step 208 to track the next stylus position. The stylus 20 was not in contact with the overlay 16, the stylus position is reported by the control processor 100 as a proximity point in step 218. Proximity information is of use to application programs run on the personal computer which are aware of the workings of the stylus sensing positions. After the proximity point is reported, the system returns to locate mode in step 204.

If the signal amplitude received by the stylus is not above the finger sense exclusion threshold in step 202, the system passes into sense mode to determine whether a finger has touched the overlay 16. The sense mode described below is similar from that disclosed in U.S. Pat. No. 4,686,332. In step 220, the wire select multiplexer 112 and the mode multiplexer 116 receive appropriate control signals from the control processor 100 to begin scanning all conductors for a change in capacitance indicating the presence of a finger. In response to these signals, the wire select multiplexer 112 begin connecting selected X and Y conductors to the capacitive measurement device 128 which has been connected by the mode multiplexer 116. The mode multiplexer 116 also disconnects the 40 KHz oscillator 126, and therefore no signals can be picked up by the stylus. If the finger touch is located in step 222 by the change in capacitance in a particular area of the overlay 16, the system goes on to a more precise scan in step 224 of the area the overlay 16 to locate the finger touch. The change in capacitance values are set back to the control processor 100 via the A/D converter 130. The finger position is output by the control processor 100 along bus 117 either to the RAM 102 or I/O controller 106. At this point, the system returns to idle mode 100. If the finger touch was not located in the initial scan of the conductors for capacitance change in step 220, the average values for the ambient capacitance of the overlay are updated, step 228, and the system returns to idle mode 200. The ambient capacitance drifts somewhat with temperature, video image and other factors. An updated average ambient capacitance is kept to determine whether any measured difference in capacitance is due to a finger touchdown on the overlay.

The term "electromagnetic" is used above to describe the type of signals generated by the overlay and measured by the stylus. Some of those skilled in the art might classify the signal amplitude received in the 40 KHz range as an electrostatic signal rather than an electromagnetic signal. In the electrostatic case, the flow of electrons to the stylus is measured, whereas in the electromagnetic case the electromagnetic field strength is measured. In either case, the device as described above would be capable of sensing stylus and finger touch position.

While the invention has been described with respect to several illustrative examples, it would be understood by those skilled in the art that modifications may be made without parting from the spirit and scope of the present invention. The embodiments presented above are for purposes of example only and are not to be taken to limit the scope of the appended claims.

We claim:

1. An improved stylus detection system having a transparent overlay with a transparent array of horizontal and vertical conductors, the horizontal conductors being spaced from the vertical conductors by an insulating material, a control processor, a radiative source for stylus detection, a switchable path to couple selected conductors to the radiative source in response to appropriate commands from the control processor and a stylus wherein:

the control processor is connected to a radiative source measurement means to receive measured radiative signal values of the conductors when the switchable path has connected a first pattern of conductors to the radiative source to detect the vertical and horizontal location of the stylus with respect to the overlay;

the control processor is connected to the radiative source measurement means when the switchable path has connected a second pattern of conductors to the radiative source to detect the height of the stylus with respect to the overlay; and, whereby stylus horizontal and vertical location and stylus height with respect to the overlay can be determined.

2. The improved stylus detection system as recited in claim 1 which further comprises:

first compensation means to compensate for the nonlinearities of the measure radiative signal values when the first pattern of conductors is connected to the radiative source to detect the vertical and horizontal location of the stylus with respect to the overlay.

3. The improved stylus detection system as recited in claim 1 which further comprises:

second compensation means to compensate for the distance of the stylus from a location on the overlay which produces a strongest radiative signal when the second pattern of conductors is connected to the radiative source to detect the height of the overlay with respect to the overlay.

4. The improved stylus detection system as recited in claim 3 which further comprises:

third compensation means to compensate for the nonlinearities of the measured radiative signal values when the second pattern of conductors is connected to the radiative source to detect the height of the overlay with respect to the overlay.

5. The improved stylus detection system as recited in claim 3 wherein the second pattern comprises connecting all of the horizontal and vertical conductors to the radiative source to produce the most uniform radiative signal across the overlay.

6. The improved stylus detection system as recited in claim 3 wherein the system labels a particular horizontal and vertical stylus location as a contact point if the compensated signal strength exceeds a contact threshold and labels a particular horizontal and vertical stylus location as a proximity point if the compensated signal strength is below the contact threshold.

7. The improved stylus detection system as recited in claim 1 wherein the stylus comprises:

a spherical antenna for receiving signals radiated from the horizontal and vertical overlay conductors to maintain the cross sectional area of the antenna which receives the radiated signals independent of the angle of the stylus with respect to the overlay;

an insulating tip cover in which the spherical antenna is embedded having an outer surface substantially concentric with the spherical antenna to maintain the distance of the spherical antenna from the overlay independent of the angle of the stylus with respect to the overlay; and an electrical shield to confine signal sensitivity to the spherical antenna within the stylus, so that the radiated signal value received by the stylus is independent of the angle of the stylus with respect to the overlay.

8. The improved stylus detection system as recited in claim 7 wherein the stylus further comprises:

a helical spring to press the spherical antenna in the top cover and to make electrical contact with the spherical antenna; and, an insulator to separate the spherical antenna from the electrical shielding.

9. An improved stylus detection system having a transparent overlay with a transparent array of horizontal and vertical conductors, the horizontal conductors being spaced from the vertical conductors by an insulating material, a control processor, a radiative source for stylus detection, a switchable path to couple selected conductors to the radiative source in response to appropriate commands from the control processor and a stylus, the stylus comprising:

a spherical antenna for receiving signals radiated from the horizontal and vertical overlay conductors to maintain the cross sectional area of the antenna which receives the radiated signals independent of the angle of the stylus with respect to the overlay;

an insulating tip cover in which the spherical antenna is embedded having an outer surface substantially concentric with the spherical antenna to maintain the distance of the spherical antenna from the overlay independent of the angle of the stylus with respect to the overlay; and, an electrical shield to confine signal sensitivity to the spherical antenna within the stylus, so that the radiated signal value received by the stylus is independent of the angle of the stylus with respect to the overlay.

10. The improved stylus detection system as recited in claim 9 wherein the stylus further comprises:

a helical spring to press the spherical antenna in the tip cover and to make electrical contract with the spherical antenna; and, an insulator to separate the spherical antenna from the electrical shielding.

11. An improved method for stylus detection in a transparent overlay having a transparent array of horizontal and vertical conductors, the horizontal conductors being spaced from the vertical conductors by an insulating material, a control processor, a radiative source for stylus detection and a means for selecting and coupling conductors to the radiative source and a stylus to receive signals radiated by the overlay comprising the steps of;

determining whether a threshold has been exceeded by a radiative signal value received by the stylus;

locating a general position of the stylus with respect to the overlay, by selecting a horizontal and a vertical conductor pair from which the stylus receives the highest strength signals;

determining whether the stylus is within a predetermined height above the overlay;

accurately tracking a precise position of the stylus, if the general position of the stylus has been located, and if the stylus is determined to be within the predetermined height above the overlay; and, repeating the tracking step as long as the stylus is within the predetermined height above the overlay.

12. The improved method for stylus detection as recited in claim 11 wherein:

the general position of the stylus is determined by successively coupling each of the vertical and horizontal conductors to the radiative source;

the precise position of the stylus is tracked by coupling a first pattern of conductors to the radiative source; and the height of the stylus is determined by coupling a second pattern of conductors to the radiative source.

13. The improved method for stylus detection as recited in claim 11 which further comprises the step of compensating for the nonlinearities of the measured radiative signal value when the first pattern is coupled to the radiative source.

14. The improved method for stylus detection as recited in claim 11 which further comprises the step of compensating for the distance of the stylus from a location on the overlay which produces a strongest radiative signal when the second pattern is coupled to the radiative source.

15. The improved method for stylus detection as recited in claim 14 which further comprises the step of compensating for the nonlinearities of the measured radiative signal values when the second pattern is coupled to the radiative source.

16. The improved method for stylus detection as recited in claim 11 wherein the stylus comprises:

a spherical antenna for receiving signals radiated from the horizontal and vertical overlay conductors to maintain the cross sectional area of the antenna which receives the radiated signals independent of the angle of the stylus with respect to the overlay;

an insulating tip cover in which the spherical antenna is embedded having an outer surface substantially concentric with the spherical antenna to maintain the distance of the spherical antenna from the overlay independent of the angle of the stylus with respect to the overlay; and an electrical shield to confine signal sensitivity to the spherical antenna within the stylus, so that the radiated signal value received by the stylus is independent of the angle of the stylus with respect to the overlay.

* * * * *